(12) United States Patent
Lung et al.

(10) Patent No.: US 10,469,153 B2
(45) Date of Patent: Nov. 5, 2019

(54) ANTENNA MEASUREMENT METHOD AND TERMINAL

(71) Applicant: Huawei Technologies Co., Ltd., Shenzhen (CN)

(72) Inventors: Hsingyu Lung, Shanghai (CN); Yanzong Zhong, Shenzhen (CN); Shengchang Shangguan, Shanghai (CN); Chaodi Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/090,449

(22) PCT Filed: Apr. 5, 2016

(86) PCT No.: PCT/CN2016/078498
§ 371 (c)(1),
(2) Date: Oct. 1, 2018

(87) PCT Pub. No.: WO2017/173581
PCT Pub. Date: Oct. 12, 2017

(65) Prior Publication Data
US 2019/0115968 A1   Apr. 18, 2019

(51) Int. Cl.
*H04B 7/08* (2006.01)
*H04B 7/04* (2017.01)
(Continued)

(52) U.S. Cl.
CPC .......... *H04B 7/0868* (2013.01); *H04B 7/04* (2013.01); *H04B 7/0404* (2013.01);
(Continued)

(58) Field of Classification Search
CPC .. H04B 7/0868; H04B 7/0404; H04B 7/0608; H04B 7/04; H04B 17/00; H04W 24/10; H04W 16/02
See application file for complete search history.

(56) References Cited

U.S. PATENT DOCUMENTS 6,118,409 A   9/2000 Pietsch et al.
7,248,843 B2  7/2007 Carvalho et al.
(Continued)

FOREIGN PATENT DOCUMENTS

CN   1757172 A    4/2006
CN   101273545 A  9/2008
(Continued)

OTHER PUBLICATIONS

Machine Translation and Abstract of Chinese Publication No. CN100471086, Mar. 18, 2009, 16 pages.
(Continued)

*Primary Examiner* — Vineeta S Panwalkar
(74) *Attorney, Agent, or Firm* — Conley Rose, P.C.

(57) ABSTRACT

An antenna measurement method and a terminal, where the method includes determining, by a first antenna selection circuit in a terminal, at least two measured antennas, setting the at least two measured antennas as a first measurement antenna, adding the first measurement antenna to an occupied antenna set, determining measurement duration of the first measurement antenna, performing a measurement operation on the first measurement antenna, determining, by a second antenna selection circuit, a second measurement antenna and measurement duration of the second measurement antenna based on the occupied antenna set and the measurement duration of the first measurement antenna, adding the second measurement antenna to the occupied antenna set, performing a measurement operation on the second measurement antenna, and determining a measure-
(Continued)

ment result of the first measurement antenna and a measurement result of the second measurement antenna.

20 Claims, 9 Drawing Sheets

(51) Int. Cl.
*H04W 16/02* (2009.01)
*H04B 7/0404* (2017.01)
*H04B 7/06* (2006.01)
*H04W 24/10* (2009.01)
*H04B 17/00* (2015.01)

(52) U.S. Cl.
CPC .......... *H04B 7/0608* (2013.01); *H04W 16/02* (2013.01); *H04W 24/10* (2013.01); *H04B 17/00* (2013.01)

(56) References Cited

U.S. PATENT DOCUMENTS

| | | | | |
|---|---|---|---|---|
| 7,847,752 | B2* | 12/2010 | Li | H04B 7/0811 |
| | | | | 343/893 |
| 8,090,329 | B2* | 1/2012 | Viorel | H01Q 1/246 |
| | | | | 370/208 |
| 8,284,718 | B2* | 10/2012 | Yurugi | H04B 7/0851 |
| | | | | 370/328 |
| 2006/0256842 | A1 | 11/2006 | Ito | |
| 2008/0212538 | A1 | 9/2008 | Molisch | |
| 2008/0247370 | A1 | 10/2008 | Gu et al. | |
| 2011/0250926 | A1 | 10/2011 | Wietfeldt et al. | |
| 2013/0308554 | A1 | 11/2013 | Ngai et al. | |
| 2014/0141791 | A1 | 5/2014 | Razavi et al. | |
| 2014/0220902 | A1 | 8/2014 | Clevorn et al. | |
| 2014/0292577 | A1 | 10/2014 | Hosoya et al. | |
| 2015/0092573 | A1 | 4/2015 | Zhang et al. | |
| 2018/0083690 | A1 | 3/2018 | Lan et al. | |

FOREIGN PATENT DOCUMENTS

| | | |
|---|---|---|
| CN | 100471086 C | 3/2009 |
| CN | 101047417 B | 6/2010 |
| CN | 102598533 A | 7/2012 |
| CN | 102668408 A | 9/2012 |
| CN | 103518394 A | 1/2014 |
| CN | 104396155 A | 3/2015 |
| EP | 2575267 B1 | 3/2015 |
| WO | 2016161632 A1 | 10/2016 |
| WO | 2016161645 A1 | 10/2016 |

OTHER PUBLICATIONS

Machine Translation and Abstract of Chinese Publication No. CN101047417, Jun. 9, 2010, 16 pages.
Machine Translation and Abstract of International Publication No. WO2016161632, Oct. 13, 2016, 21 pages.
"3rd Generation Partnership Project; Technical Specification Group Core Network and Terminals; Mobile radio interface Layer 3 specification; Core network protocols; Stage 3 (Release 13)," 3GPP TS 24.008, V13.5.0, Mar. 2016, 740 pages.
Foreign Communication From a Counterpart Application, European Application No. 16897516.7, Extended European Search Report dated Dec. 7, 2018, 10 pages.
Foreign Communication From a Counterpart Application, PCT Application No. PCT/CN2016/078498, English Translation of International Search Report dated Jan. 6, 2017, 4 pages.
Foreign Communication From a Counterpart Application, PCT Application No. PCT/CN2016/078498, English Translation of Written Opinion dated Jan. 6, 2017, 5 pages.

* cited by examiner

ANTENNA MEASUREMENT METHOD AND TERMINAL

CROSS-REFERENCE TO RELATED APPLICATIONS

This application is a U.S. National Stage of International Patent Application No. PCT/CN2016/078498 filed on Apr. 5, 2016, which is hereby incorporated by reference in its entirety.

TECHNICAL FIELD

The present invention relates to communications technologies, and in particular, to an antenna measurement method and a terminal.

BACKGROUND

In some existing mobile terminals, a plurality of antennas are disposed in different positions inside the terminal, and different modules in the terminal, for example, a main of a primary mode, a diversity of the primary mode, a main of a secondary mode, and a diversity of the secondary mode of a multi-card and multi-mode terminal, use different antennas in the terminal. If fixed antennas are disposed for different modules, when a user uses the terminal and holds an antenna corresponding to a module that is operating, communication performance of the module that is operating is attenuated, resulting in a high call drop rate or network disconnection rate.

To resolve the foregoing problem, an antenna measurement selection method is provided in the prior art. The fixed antennas are not disposed for different modules in the terminal, and when a module needs to use an antenna, the module measures and selects the antenna. Specifically, for example, in a Long Term Evolution (Long Term Evolution, LTE for short) system, different modules in the terminal have different priorities, and a module with a highest priority may select two antennas for measurement and select one of the antennas as an antenna finally used. Other modules than the module with the highest priority do not have a capability to measure and select an antenna, and antennas that can be used by these modules are determined by an inherent hardware connection.

However, the solution used in the prior art cannot ensure communication performance of all modules in the terminal, and therefore there is still a problem of a high call drop rate or network disconnection rate.

SUMMARY

Embodiments of the present invention provide an antenna measurement method and a terminal, so as to resolve a problem of a high call drop rate or network disconnection rate in the prior art.

A first aspect of the present invention provides an antenna measurement method, where the method is applied to a terminal that includes at least two antenna selection modules, and the method includes:

determining, by a first antenna selection module with a high priority in the terminal, at least two measured antennas, using the determined at least two measured antennas as a first measurement antenna, and adding the first measurement antenna to an occupied antenna set; further, determining, by the first antenna selection module, measurement duration of the first measurement antenna; and further, performing, by the first antenna selection module, a measurement operation on the first measurement antenna.

Based on the measurement operation performed by the first antenna selection module, a second antenna selection module whose priority is lower than the priority of the first antenna selection module determines a second measurement antenna and measurement duration of the second measurement antenna based on the occupied antenna set and the measurement duration of the first measurement antenna, and adds the second measurement antenna to the occupied antenna set. Further, the second antenna selection module performs a measurement operation on the second measurement antenna.

The first antenna selection module and the second antenna selection module determine a measurement result of the first measurement antenna and a measurement result of the second measurement antenna when the measurement duration of the first measurement antenna ends.

The first antenna selection module and the second antenna selection module are modules capable of independently using an antenna in the terminal. In the foregoing process, the second antenna selection module may simultaneously perform the antenna measurement operation when the first antenna selection module performs the antenna measurement operation, in other words, all modules in the terminal have a capability to measure and select an antenna, so as to ensure that all the modules may select a better quality antenna.

In a possible design, the determining, by a second antenna selection module, a second measurement antenna and measurement duration of the second measurement antenna based on the occupied antenna set and the measurement duration of the first measurement antenna includes:

obtaining, by the second antenna selection module, the occupied antenna set and the measurement duration of the first measurement antenna;

determining, by the second antenna selection module, the second measurement antenna based on the occupied antenna set; and calculating, by the second antenna selection module, a difference between the measurement duration of the first measurement antenna and duration that is of the second measurement antenna and that is determined by the second antenna selection module, and using the difference as the measurement duration of the second measurement antenna.

In a possible design, the obtaining, by the second antenna selection module, the occupied antenna set and the measurement duration of the first measurement antenna includes:

sending, by the first antenna selection module, a notification message to the second antenna module, where the notification message includes the occupied antenna set and the measurement duration of the first measurement antenna; and receiving, by the second antenna selection module, the notification message, and obtaining the occupied antenna set and the measurement duration of the first measurement antenna from the notification message.

In a possible design, the obtaining, by the second antenna selection module, the occupied antenna set and the measurement duration of the first measurement antenna includes:

obtaining, by the second antenna selection module, the occupied antenna set and the measurement duration of the first measurement antenna from a preset storage unit.

In a possible design, the determining, by the second antenna selection module, the second measurement antenna based on the occupied antenna set includes:

selecting, by the second antenna selection module from measured antennas outside the occupied antenna set, at least two measured antennas as the second measurement antenna. In other words, the measurement antenna selected by the second antenna selection module does not overlap measurement antennas of all modules before the second antenna selection module.

In a possible design, the occupied antenna set includes an occupied time period of each occupied antenna in measured antennas of the terminal, and correspondingly, the determining, by the second antenna selection module, the second measurement antenna based on the occupied antenna set includes:

selecting, by the second antenna selection module from the occupied antenna set, at least one antenna as a to-be-occupied antenna;

determining, by the second antenna selection module, an occupied time period of the to-be-occupied antenna, so that the occupied time period of the to-be-occupied antenna does not overlap an occupied time period of an occupied antenna other than the to-be-occupied antenna in the occupied antenna set;

selecting, by the second antenna selection module, at least one measured antenna from measured antennas outside the occupied antenna set, and determining an occupied time period of the at least one measured antenna; and using, by the second antenna selection module, a set of the at least one measured antenna and the to-be-occupied antenna as the second measurement antenna.

In a possible design, after the performing, by the first antenna selection module, a measurement operation on the first measurement antenna, the method further includes:

writing, by the first antenna selection module, the occupied antenna set and the measurement duration of the first measurement antenna into the preset storage unit.

In a possible design, after the performing, by the second antenna selection module, a measurement operation on the second measurement antenna, the method further includes:

writing, by the second antenna selection module, the occupied antenna set and the measurement duration of the second measurement antenna into the preset storage unit.

In a possible design, the determining, by the first antenna selection module and the second antenna selection module, a measurement result of the first measurement antenna and a measurement result of the second measurement antenna when the measurement duration of the first measurement antenna ends includes:

if the measurement duration of the first measurement antenna ends, but the second antenna selection module does not complete measurement of the second measurement antenna, stopping, by the second antenna selection module, performing the measurement operation, and using, as the measurement result of the second measurement antenna, a measurement result of an antenna that has been measured in the second measurement antenna.

In a possible design, the method further includes:

obtaining, by the first antenna selection module, the first measurement antenna and the measurement duration of the first measurement antenna from a preset configuration table; and obtaining, by the second antenna selection module, the second measurement antenna and the measurement duration of the second measurement antenna from the preset configuration table.

A second aspect of the present invention provides a terminal, and the terminal includes a first antenna selection module and a second antenna selection module.

The first antenna selection module includes a first determining unit and a first measurement unit, where the first determining unit is configured to: determine at least two measured antennas, use the determined at least two measured antennas as a first measurement antenna, and add the first measurement antenna to an occupied antenna set, the first determining unit is further configured to determine measurement duration of the first measurement antenna, and the first measurement unit is configured to perform a measurement operation on the first measurement antenna.

The second antenna measurement unit includes a second determining unit and a second measurement unit, where the second determining unit is configured to: determine a second measurement antenna and measurement duration of the second measurement antenna based on the occupied antenna set and the measurement duration of the first measurement antenna, and add the second measurement antenna to the occupied antenna set, the second measurement unit is configured to perform a measurement operation on the second measurement antenna, and the first measurement unit and the second measurement unit determine a measurement result of the first measurement antenna and a measurement result of the second measurement antenna when the measurement duration of the first measurement antenna ends, where the first antenna selection module and the second antenna selection module are modules capable of independently using an antenna in the terminal, and a priority of the second antenna selection module for selecting the measured antenna is lower than a priority of the first antenna selection module for selecting the measured antenna.

In a possible design, the second antenna selection module further includes a second obtaining unit and a second calculation unit, where the second obtaining unit is configured to obtain the occupied antenna set and the measurement duration of the first measurement antenna, the second determining unit is further configured to determine the second measurement antenna based on the occupied antenna set, and the second calculation unit is configured to: calculate a difference between the measurement duration of the first measurement antenna and duration that is of the second measurement antenna and that is determined by the second antenna selection module, and use the difference as the measurement duration of the second measurement antenna.

In a possible design, the second obtaining unit is specifically configured to:

receive a notification message sent by the first antenna module, where the notification message includes the occupied antenna set and the measurement duration of the first measurement antenna; and obtain the occupied antenna set and the measurement duration of the first measurement antenna from the notification message.

In a possible design, the second obtaining unit is further specifically configured to:

obtain the occupied antenna set and the measurement duration of the first measurement antenna from a preset storage unit.

In a possible design, the second determining unit is specifically configured to:

select, from measured antennas outside the occupied antenna set, at least two measured antennas as the second measurement antenna.

In a possible design, the occupied antenna set includes an occupied time period of each occupied antenna in measured antennas of the terminal, and correspondingly, the second determining unit is further specifically configured to:

select, from the occupied antenna set, at least one antenna as a to-be-occupied antenna; determine an occupied time period of the to-be-occupied antenna, so that the occupied time period of the to-be-occupied antenna does not overlap an occupied time period of an occupied antenna other than the to-be-occupied antenna in the occupied antenna set; select at least one measured antenna from measured antennas outside the occupied antenna set, and determine an occupied time period of the at least one measured antenna; and use a set of the at least one measured antenna and the to-be-occupied antenna as the second measurement antenna.

In a possible design, the first antenna selection module further includes:

a first writing unit, configured to write the occupied antenna set and the measurement duration of the first measurement antenna into the preset storage unit.

In a possible design, the second antenna selection module further includes:

a second writing unit, configured to write the occupied antenna set and the measurement duration of the second measurement antenna into the preset storage unit.

In a possible design, that the first measurement unit and the second measurement unit determine a measurement result of the first measurement antenna and a measurement result of the second measurement antenna when the measurement duration of the first measurement antenna ends is specifically:

if the measurement duration of the first measurement antenna ends, but the second measurement unit does not complete measurement of the second measurement antenna, stopping, by the second measurement unit, performing the measurement operation, and using, as the measurement result of the second measurement antenna, a measurement result of an antenna that has been measured in the second measurement antenna.

In a possible design, the first antenna selection module further includes:

a first obtaining unit, configured to obtain the first measurement antenna and the measurement duration of the first measurement antenna from a preset configuration table; and the second obtaining unit is further configured to obtain the second measurement antenna and the measurement duration of the second measurement antenna from the preset configuration table.

A third aspect of the present invention provides a terminal, including a memory and a processor, where the memory is configured to store a program instruction, and the processor is configured to invoke the program instruction in the memory to perform the following method.

The processor controls a first antenna selection module to:

determine at least two measured antennas, use the determined at least two measured antennas as a first measurement antenna, and add the first measurement antenna to an occupied antenna set;

determine measurement duration of the first measurement antenna; and perform a measurement operation on the first measurement antenna.

The processor controls a second antenna selection module to:

determine a second measurement antenna and measurement duration of the second measurement antenna based on the occupied antenna set and the measurement duration of the first measurement antenna, and add the second measurement antenna to the occupied antenna set; and perform a measurement operation on the second measurement antenna.

The processor controls the first antenna selection module and the second antenna selection module to: when the measurement duration of the first measurement antenna ends, determine a measurement result of the first measurement antenna and a measurement result of the second measurement antenna, where the first antenna selection module and the second antenna selection module are modules capable of independently using an antenna in the terminal, and a priority of the second antenna selection module for selecting the measured antenna is lower than a priority of the first antenna selection module for selecting the measured antenna.

In a possible design, the processor is specifically configured to:

control the second antenna selection module to:

obtain the occupied antenna set and the measurement duration of the first measurement antenna;

determine the second measurement antenna based on the occupied antenna set; and calculate a difference between the measurement duration of the first measurement antenna and duration that is of the second measurement antenna and that is determined by the second antenna selection module, and use the difference as the measurement duration of the second measurement antenna.

In a possible design, the processor is further specifically configured to:

control the first antenna selection module to:

send a notification message to the second antenna module, where the notification message includes the occupied antenna set and the measurement duration of the first measurement antenna; and control the second antenna selection module to:

receive the notification message and obtain the occupied antenna set and the measurement duration of the first measurement antenna from the notification message.

In a possible design, the processor is further specifically configured to:

control the second antenna selection module to:

obtain the occupied antenna set and the measurement duration of the first measurement antenna from a preset storage unit.

In a possible design, the processor is further specifically configured to:

control the second antenna selection module to:

select, from measured antennas outside the occupied antenna set, at least two measured antennas as the second measurement antenna.

In a possible design, the occupied antenna set includes an occupied time period of each occupied antenna in measured antennas of the terminal, and correspondingly, the processor is further specifically configured to:

control the second antenna selection module to:

select, from the occupied antenna set, at least one antenna as a to-be-occupied antenna;

determine an occupied time period of the to-be-occupied antenna, so that the occupied time period of the to-be-occupied antenna does not overlap an occupied time period of an occupied antenna other than the to-be-occupied antenna in the occupied antenna set;

select at least one measured antenna from measured antennas outside the occupied antenna set, and determine an occupied time period of the at least one measured antenna; and use a set of the at least one measured antenna and the to-be-occupied antenna as the second measurement antenna.

In a possible design, the processor is further specifically configured to:

control the first antenna selection module to:

write the occupied antenna set and the measurement duration of the first measurement antenna into the preset storage unit.

In a possible design, the processor is further specifically configured to:

control the second antenna selection module to:

write the occupied antenna set and the measurement duration of the second measurement antenna into the preset storage unit.

In a possible design, the processor is further specifically configured to:

if the measurement duration of the first measurement antenna ends, but the second antenna selection module does not complete measurement of the second measurement antenna, control the second antenna selection module to:

stop performing the measurement operation, and use, as the measurement result of the second measurement antenna, a measurement result of an antenna that has been measured in the second measurement antenna.

In a possible design, the processor is further specifically configured to:

control the first antenna selection module to:

obtain the first measurement antenna and the measurement duration of the first measurement antenna from a preset configuration table; and control the second antenna selection module to:

obtain the second measurement antenna and the measurement duration of the second measurement antenna from the preset configuration table.

In a possible design, the preset configuration table is used to indicate a correspondence among an antenna selection module, a measurement antenna, and measurement duration.

In a possible design, the first antenna selection module includes at least: a main of a primary mode, a diversity of the primary mode, a main of a secondary mode, and a diversity of the secondary mode.

Using the solutions in the embodiments of the present invention enables all antenna selection modules in the terminal to perform antenna measurement in parallel, so that communication performance of all the antenna selection modules in the terminal is improved, and a call drop rate and a network disconnection rate are reduced.

BRIEF DESCRIPTION OF DRAWINGS

To describe the technical solutions in some embodiments of the present disclosure more clearly, the following briefly describes the accompanying drawings for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
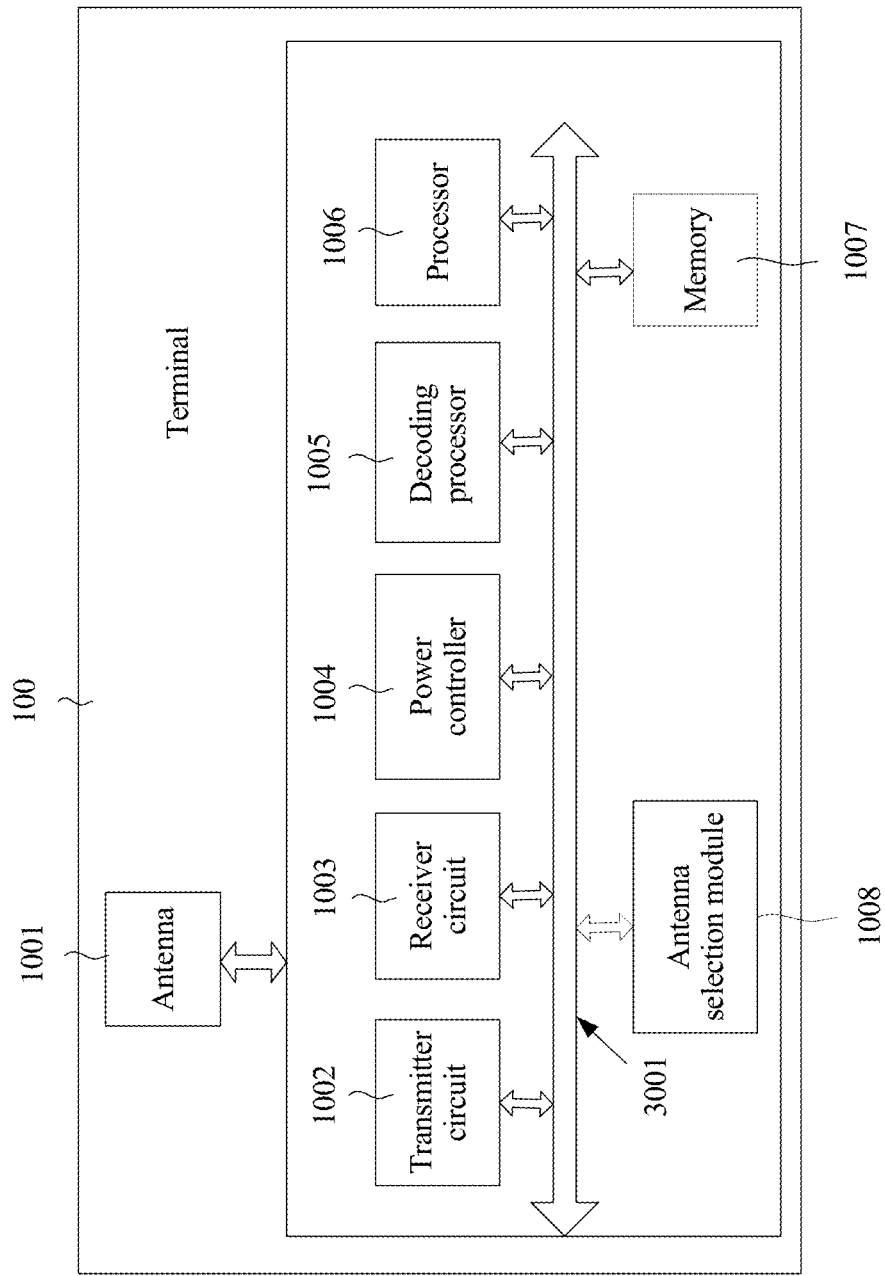
FIG. 1 is a schematic diagram of a terminal according to an embodiment of the present invention.

FIG. 1 is a schematic diagram of a terminal according to an embodiment of the present invention. As shown in FIG. 1, a terminal 100 includes a transmitter circuit 1002, a receiver circuit 1003, a power controller 1004, a processor 1006, a memory 1007, and an antenna 1001. The processor 1006 controls an operation of the terminal 100. The memory 1007 may include a read-only memory and a random access memory, and provide an instruction and data to the processor 1006. A part of the memory 1007 may further include a nonvolatile random access memory (Nonvolatile RAM, NVRAM for short). In a specific application, the terminal 100 may be built in or the terminal 100 may be a wireless communications device such as a mobile phone, and may further include a carrier that accommodates the transmitter circuit 1002 and the receiver circuit 1003, so as to allow data transmission and receiving between the terminal 100 and a remote location. The transmitter circuit 1002 and the receiver circuit 1003 may be coupled to the antenna 1001. The antenna 1001 may include a plurality of antennas. Components in the terminal 100 are coupled together by using a bus system 3100, and the bus system 3100 further includes a power bus, a control bus, and a status signal bus in addition to a data bus. However, for clarity of description, various buses are marked as the bus system 3100 in the figure. The terminal 100 may further include a decoding processor 1005. The terminal 100 further includes an antenna selection module 1008, and the antenna selection module is a module capable of independently using an antenna to transmit or receive a signal in the terminal. In other words, the terminal 100 may interact with the antenna 1001 by using the transmitter circuit 1002 and the receiver circuit 1003. The terminal may include a plurality of antenna selection modules.

All antenna selection modules described below in this embodiment of the present invention may be considered as a specific instance of the antenna selection module 1008.

As described above, the terminal has a plurality of modules capable of independently using the antenna to transmit and receive the signal. In the prior art, only a module with a highest priority in these modules has a capability to measure and select the antenna, and another module does not have the capability to measure and select the antenna and can rely only on an inherent hardware connection to measure and select the antenna. Therefore, the solution provided in the prior art provides only the module with the highest priority in the terminal with the capability to measure and select the antenna, and the another module cannot measure and select an optimal antenna even when an idle optimal antenna is available. In addition, even for the module with the highest priority, in the prior art, the module with the highest priority is allowed to measure only two antennas and then finally select one antenna. If the two antennas are not the optimal antenna, and the optimal antenna is in an idle state, the module with the highest priority still cannot measure and select the optimal antenna. Due to the foregoing problem in the prior art, communication performance of the module in the terminal cannot be ensured.

To resolve the foregoing problem in the prior art, this embodiment of the present invention provides an antenna measurement method. In the method, all modules in the terminal are allowed to perform antenna measurement in parallel within a same time period, in other words, all the modules are allowed to have the capability to measure and select the antenna. Each module performs subsequent antenna selection based on a measurement result of the antenna, so as to ensure communication performance of all the modules.

It should be noted that the "antenna selection module" in this embodiment of the present invention is the module capable of independently using the antenna to transmit or receive the signal in the terminal, and includes but is not limited to: a main of a primary mode (a primary SIM card), a diversity of the primary mode (the primary SIM card), a main of a secondary mode (a secondary SIM card), a diversity of the secondary mode (the secondary SIM card), a subcarrier main of the primary mode (the primary SIM card), a subcarrier diversity of the primary mode (the primary SIM card), a Code Division Multiple Access (Code Division Multiple Access, CDMA for short) main of simultaneous voice and LTE (simultaneous voice and LTE, SVLTE for short), a CDMA diversity of the SVLTE, an LTE main of the SVLTE, an LTE diversity of the SVLTE, and Wireless-Fidelity (Wireless-Fidelity, WiFi for short).

Figure 2:
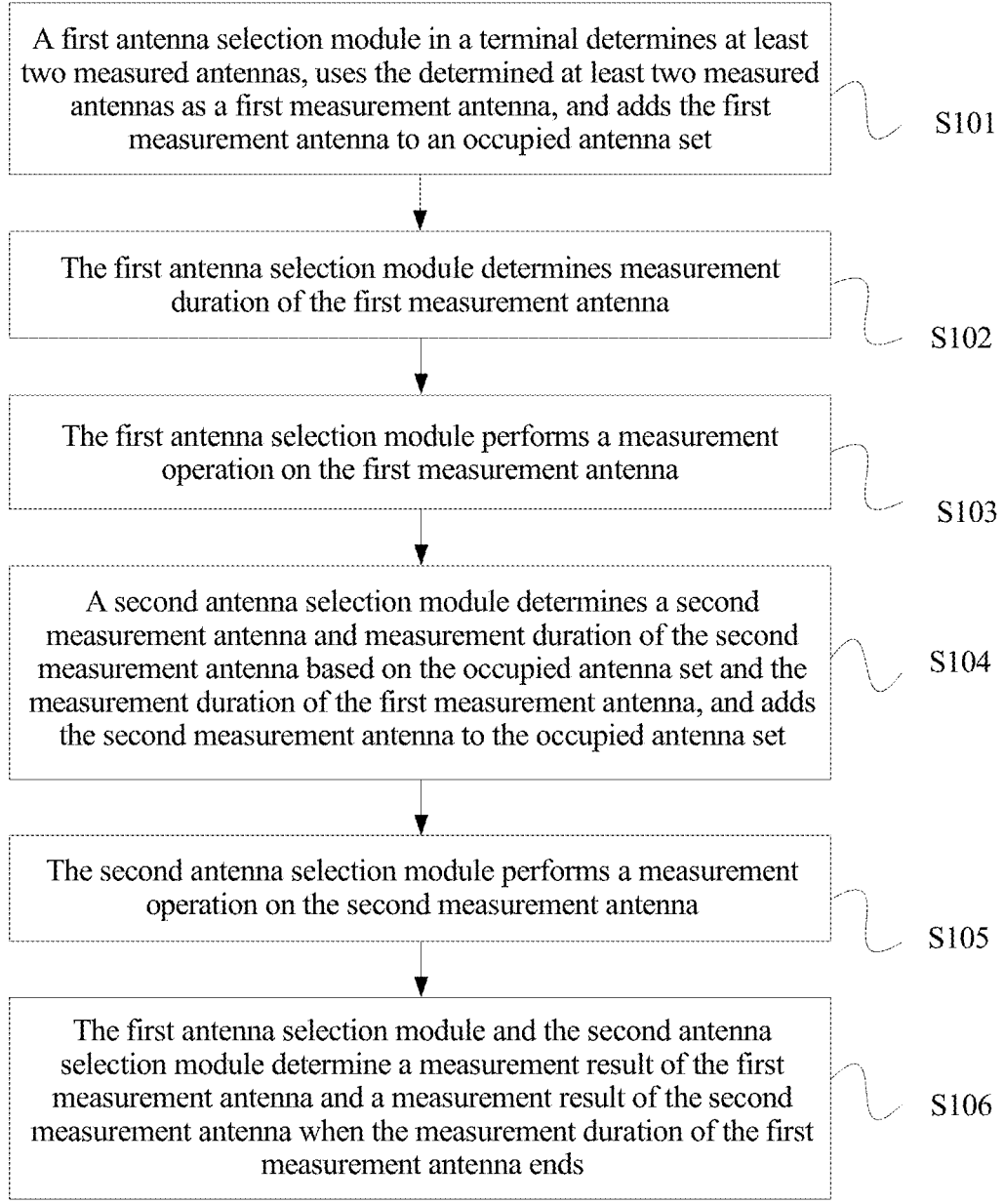
FIG. 2 is a schematic flowchart of Embodiment 1 of an antenna measurement method according to an embodiment of the present invention.

FIG. 2 is a schematic flowchart of Embodiment 1 of an antenna measurement method according to an embodiment of the present invention. The method is performed by a terminal that includes at least two antenna selection modules.

It should be noted that, in an actual antenna measurement process provided in this embodiment, all modules that need to measure and select an antenna in the terminal are involved. The antenna measurement process starts from a module with a highest priority in the terminal, measurement duration is determined, and all other modules perform respective antenna measurement in sequence within the measurement duration. This embodiment provides measurement and interaction processes of any two modules whose priorities are adjacent. An overall measurement process is performed by analogy based on the measurement and interaction processes. Apparently, these processes fall within the protection scope of this embodiment of the present invention.

As shown in FIG. 2, the method includes the following steps.

S101. A first antenna selection module in a terminal determines at least two measured antennas, uses the determined at least two measured antennas as a first measurement antenna, and adds the first measurement antenna to an occupied antenna set.

The first antenna selection module and the following second antenna selection module are modules capable of independently using an antenna in the terminal, and a priority of the second antenna selection module for selecting the measured antenna is lower than a priority of the first antenna selection module for selecting the measured antenna. In other words, the antenna measurement is initiated from the module with the highest priority, and an antenna measurement operation is performed downwards level by level.

The terminal includes a plurality of modules, and further includes a plurality of antennas that may be used by the plurality of the modules. To select an appropriate antenna from the plurality of the antennas for use, the plurality of the modules measure all antennas in the terminal, so as to select an antenna based on a measurement result. Each module in the terminal, for example, the first selection module in this embodiment selects and measures the at least two of the antennas in each measurement. Therefore, each module in the terminal may need to perform antenna measurement for a plurality of times. For this embodiment of the present invention, to be specific, this embodiment is performed for a plurality of times, so as to finally complete all antenna measurements.

After selecting the antennas that need to be measured, the first selection module adds the selected antennas to the occupied antenna set. The set is used to record an occupied antenna in each measurement process, and is constantly updated by each module in the antenna measurement process. For example, if the first selection module is the module with the highest priority, the occupied antenna set is empty in this case, and the first selection module writes occupied antenna information into the set when selecting the measurement antenna. If antennas numbered 1 and 3 are occupied, when a next selection module performs antenna selection and finds, based on the occupied antenna information recorded in the set, that the antennas numbered 1 and 3 have been occupied, the next selection module selects antennas other than the antennas numbered 1 and 3, for example, antennas numbered 4 and 7, and writes this selection result into the set. Then, a subsequent module adds a new value to the set in sequence. Therefore, an antenna selection conflict caused by antenna occupation during the antenna measurement may be avoided.

For a specific method for determining the measured antennas by the first antenna selection module, refer to the prior art, and details are not described herein.

S102. The first antenna selection module determines measurement duration of the first measurement antenna.

After selecting the antennas that need to be measured, the first selection module determines, based on an actual condition of the selected antennas, the measurement duration of the antennas that need to be measured.

Specifically, if the first selection module is the module with the highest priority, measurement duration corresponding to the selected antennas may be directly used as the measurement duration. If the first selection module is not the module with the highest priority, the measurement duration needs to be determined based on a time specified by a higher priority.

S103. The first antenna selection module performs a measurement operation on the first measurement antenna.

For a specific method for performing the measurement operation, refer to the prior art, and details are not described herein.

S104. A second antenna selection module determines a second measurement antenna and measurement duration of the second measurement antenna based on the occupied antenna set and the measurement duration of the first measurement antenna, and adds the second measurement antenna to the occupied antenna set.

The second antenna selection module is considered as a module with a lower priority in two modules interacting with each other, and the second selection module starts measurement in a process of performing the operation by the first selection module. To be specific, parallel antenna measurement between modules is implemented.

A measurement antenna and measurement duration that may be selected by the second selection module need to be determined based on a module with a higher priority that interacts with the second selection module.

S105. The second antenna selection module performs a measurement operation on the second measurement antenna.

S106. The first antenna selection module and the second antenna selection module determine a measurement result of the first measurement antenna and a measurement result of the second measurement antenna when the measurement duration of the first measurement antenna ends.

To be specific, an actual measurement time of the module with the lower priority cannot be determined by the module with the lower priority, but is determined by the module with the higher priority, and the measurement time of the module with the lower priority needs to be within the measurement time of the module with the higher priority. This can ensure that after one measurement time is determined by the module with the highest priority during each measurement, measurement times of modules with lower priorities are within this time range. In other words, the modules terminate measurement when the measurement duration of the first measurement antenna ends. Therefore, during one measurement, the modules may participate in the antenna selection, and each antenna may be measured. During a next measurement, no antenna measurement conflict occurs.

In this embodiment, all modules in the terminal may have a capability to measure and select the antenna, in other words, may complete antenna measurements in parallel in a unified time period, so that all the modules may select a better quality antenna, and in addition, no antenna measurement conflict occurs and efficiency is improved because the antenna measurements are performed in parallel. In addition, in this embodiment, each module is allowed to select at least two antennas for measurement each time, and finally measure all the antennas in the terminal, so that each module can select an optimal quality antenna based on a measurement result.

Figure 3:
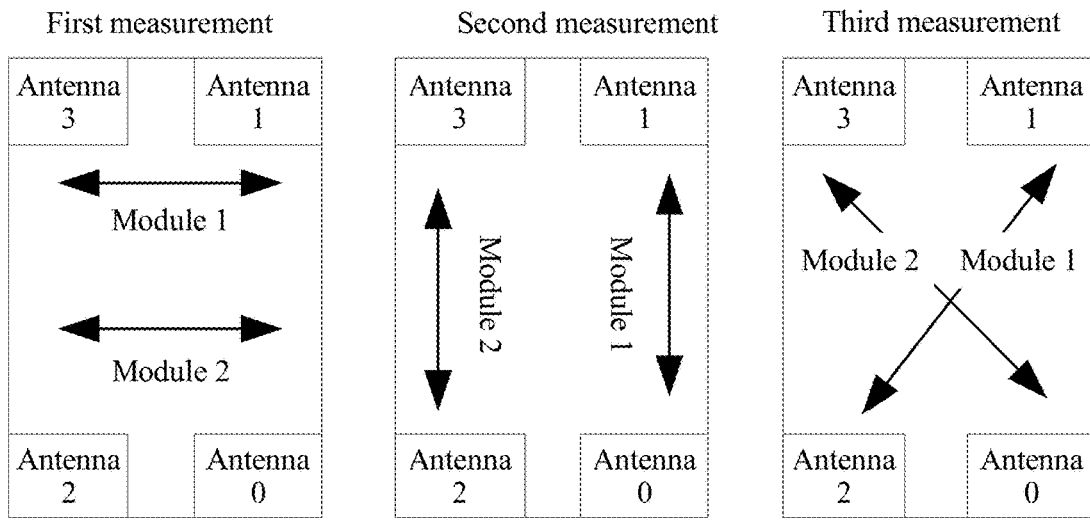
FIG. 3 is an example diagram of performing a complete measurement process by various modules in a terminal.

As shown above, all the modules in the terminal may complete the measurement for all the antennas in the terminal by performing the foregoing embodiment for a plurality of times. FIG. 3 is an example diagram of performing a complete measurement process by various modules in a terminal. As shown in FIG. 3, it is assumed that there are two antenna selection modules, namely, a module 1 and a module 2 in the terminal, where a priority of the module 1 is higher than a priority of the module 2; the terminal includes four antennas; and each antenna selection module measures two antennas each time. In this case, measurement needs to be performed three times to complete measurements for all antennas. Each step in FIG. 3 represents performing one antenna measurement in which all modules corresponding to the foregoing embodiment participate. After the process shown in FIG. 3 ends, all antenna measurement modules in the terminal complete the measurements for all the antennas in the terminal. It should be noted that in each measurement, the module 1 performs a plurality of rounds of measurement on antennas 1 and 3, and determines an average result based on results of the plurality of rounds of measurement. The module 2 performs a plurality of rounds of measurement on antennas 0 and 2, and determines an average result based on results of the plurality of rounds of measurement.

Figure 4:
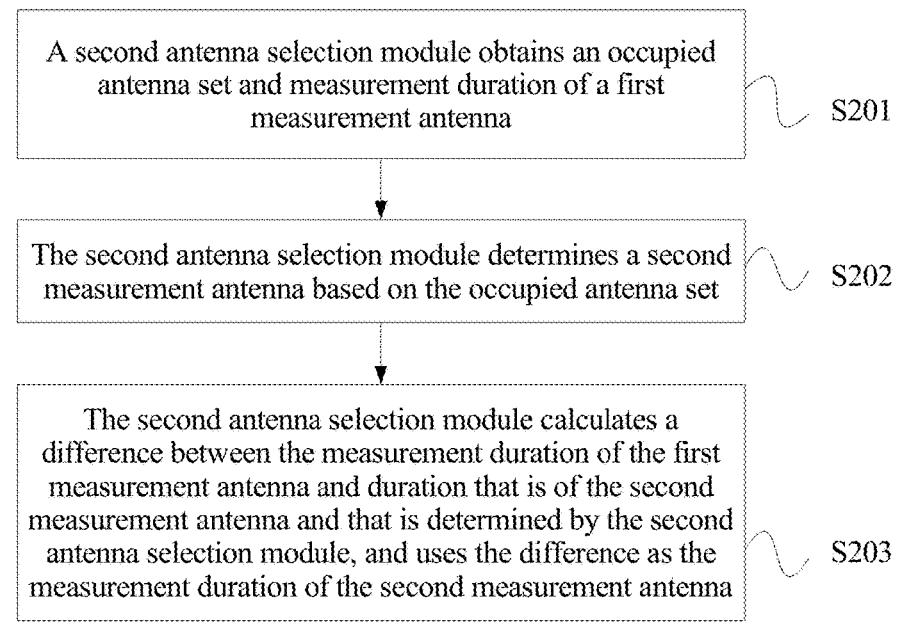
FIG. 4 is a schematic flowchart of Embodiment 2 of an antenna measurement method according to an embodiment of the present invention.

Based on the foregoing embodiment, an embodiment provides a process in which a second antenna selection module determines a second measurement antenna and measurement duration of the second measurement antenna. To be specific, FIG. 4 is a schematic flowchart of Embodiment 2 of an antenna measurement method according to an embodiment of the present invention. As shown in FIG. 4, step S104 may specifically include the following steps.

S201. A second antenna selection module obtains an occupied antenna set and measurement duration of a first measurement antenna.

After the occupied antenna set and the measurement duration of the first measurement antenna are determined by a first antenna selection module with a high priority, the second selection module is notified in a specific manner, for example, a message notification or writing into a preset unit.

S202. The second antenna selection module determines a second measurement antenna based on the occupied antenna set.

S203. The second antenna selection module calculates a difference between the measurement duration of the first measurement antenna and duration that is of the second measurement antenna and that is determined by the second antenna selection module, and uses the difference as the measurement duration of the second measurement antenna.

To be specific, the measurement duration of the second measurement antenna of the second antenna selection module is determined by a module with a higher priority, and the measurement duration of the second measurement antenna of the second antenna selection module needs to be within measurement duration of the module with the higher priority. If the measurement duration of the first measurement antenna ends, but the second selection module does not complete measurement of the second measurement antenna for some reasons, the second antenna selection module needs to stop performing a measurement operation, so as to ensure that no conflict occurs on the measurement operation. In addition, the second antenna selection module uses, as a measurement result of the second measurement antenna, a measurement result of an antenna that has been measured in the second measurement antenna.

Based on the foregoing embodiment, this embodiment provides a manner in which the second antenna selection module obtains the occupied antenna set and the measurement duration of the first measurement antenna. To be specific, an implementation of step S201 is as follows:

The first antenna selection module sends a notification message to the second antenna module, where the notification message includes the occupied antenna set and the measurement duration of the first measurement antenna.

The second antenna selection module receives the notification message, and obtains the occupied antenna set and the measurement duration of the first measurement antenna from the notification message.

In this embodiment, in a process of each antenna measurement, a module in the terminal transmits information about an occupied antenna and measurement duration in a message exchange manner. The message exchange manner enables the second antenna selection module to start to perform an antenna measurement process after the second antenna selection module receives the notification message, in other words, antenna measurement may be started without requiring an additional trigger condition, and this can save time overheads in each antenna measurement.

Figure 5:
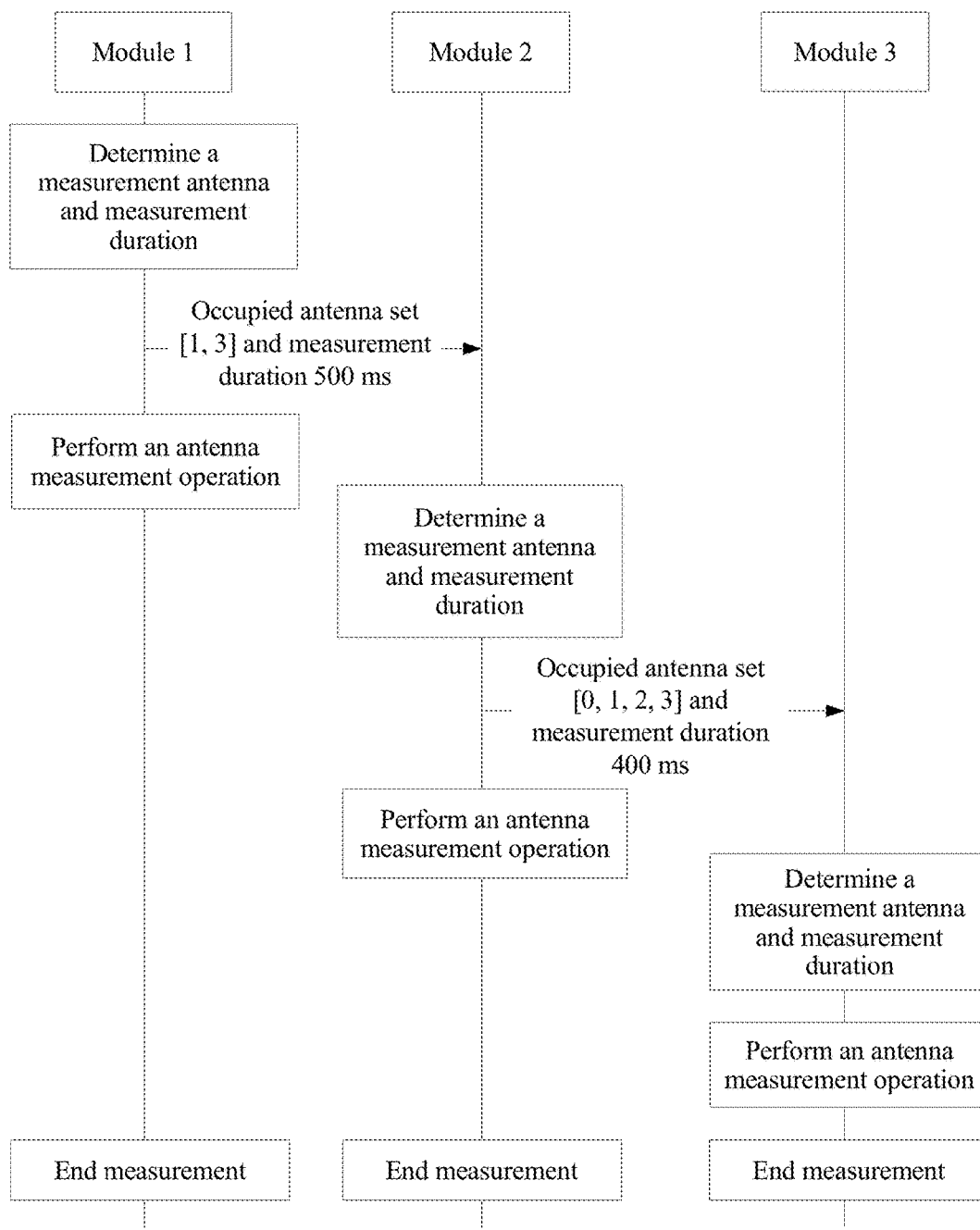
FIG. 5 is a schematic diagram of performing antenna measurement in a notification message manner between modules.

FIG. 5 is a schematic diagram of performing antenna measurement in a notification message manner between modules. As shown in FIG. 5, it is assumed that there are three antenna selection modules, namely, a module 1, a module 2, and a module 3 in a terminal, where a priority of the module 1 is highest and a priority of the module 3 is lowest; and each module measures two antennas each time. In this case, the antenna measurement is initiated by the module 1. After selecting a measurement antenna and determining measurement duration of the antenna, the module 1 notifies the module 2 of the foregoing information by using a message. On this basis, the module 2 adds an occupied antenna and re-determines measurement duration, and then notifies the module 3 of the foregoing information by using a message. Modules 1, 2, and 3 terminate measurement at the same time and complete first measurement for a measurement antenna. FIG. 5 shows only the first measurement. After completing the first measurement, the modules 1, 2, and 3 in the terminal perform the foregoing operations in sequence again: determining the measurement antenna and the measurement duration, performing antenna measurement, and transmitting information about an occupied antenna set and the measurement duration to a module with a lower priority, so as to complete a second measurement, a third measurement, or more measurements until each module completes measurements for all antennas in the terminal. In this case, each module selects an optimal measured antenna based on a plurality of measurement results.

Based on the foregoing embodiment, this embodiment provides another manner in which a second antenna selection module obtains the occupied antenna set and measurement duration of a first measurement antenna. To be specific, another implementation of step S201 is as follows:

The second antenna selection module obtains the occupied antenna set and the measurement duration of the first measurement antenna from a preset storage unit.

Specifically, the second antenna selection module actively reads the occupied antenna set and the measurement duration of the first measurement antenna from the preset storage unit when needing to perform antenna measurement, and content in the preset storage unit is written by a module with a high priority during antenna measurement.

Compared with a previous obtaining manner, the obtaining manner in this embodiment is actively started by the module as actually required, without a need of waiting for a notification message from the module with the high priority. Therefore, the obtaining manner in this embodiment can better meet a measurement requirement of each module.

Based on the foregoing embodiment, before the second antenna selection module obtains the occupied antenna set and the measurement duration of the first measurement antenna from the preset storage unit, the first antenna selection module writes the occupied antenna set and the measurement duration of the first measurement antenna into the preset storage unit after performing a measurement operation on the first measurement antenna. This ensures that the second antenna selection module obtains correct information.

Further, after performing a measurement operation on the second measurement antenna, the second antenna selection module also writes a new occupied antenna set and measurement duration of the second measurement antenna into the preset storage unit, so as to ensure that the module with a lower priority obtains correct information.

Based on the foregoing embodiment, this embodiment provides a manner in which the second antenna selection module determines the second measurement antenna based on the occupied antenna set. To be specific, an implementation of step S202 is as follows:

The second antenna selection module selects, from measured antennas outside the occupied antenna set, at least two measured antennas as the second measurement antenna.

Preferably, the occupied antenna set corresponding to the manner includes only an identifier of an occupied antenna in the measured antennas of the terminal. The identifier of the occupied antenna may be a name and a number of the occupied antenna, or another performance parameter of the occupied antenna.

Figure 6:
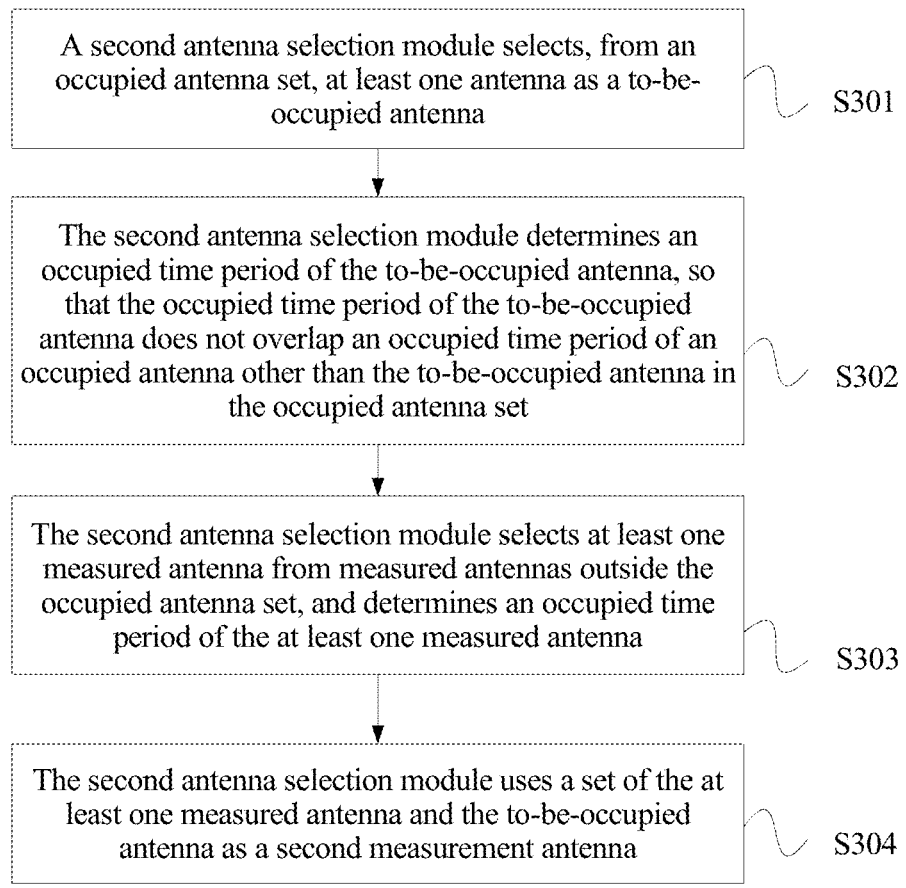
FIG. 6 is a schematic flowchart of Embodiment 3 of an antenna measurement method according to an embodiment of the present invention.

Specifically, when the occupied antenna set includes only the identifier of the occupied antenna in the measured antennas of the terminal, the set is used to indicate which antenna has been completely occupied. Once the antenna is completely occupied, another module cannot use the antenna. Therefore, the another module needs to select a measurement antenna from the measured antennas outside the set. Based on the foregoing embodiment, this embodiment provides another manner in which the second antenna selection module determines the second measurement antenna based on the occupied antenna set. To be specific, FIG. 6 is a schematic flowchart of Embodiment 3 of an antenna measurement method according to an embodiment of the present invention. An occupied antenna set corresponding to this embodiment includes an occupied time period of each occupied antenna in measured antennas of a terminal. As shown in FIG. 6, another implementation of step S202 is as follows:

S301. A second antenna selection module selects, from an occupied antenna set, at least one antenna as a to-be-occupied antenna.

S302. The second antenna selection module determines an occupied time period of the to-be-occupied antenna, so that the occupied time period of the to-be-occupied antenna does not overlap an occupied time period of an occupied antenna other than the to-be-occupied antenna in the occupied antenna set.

S303. The second antenna selection module selects at least one measured antenna from measured antennas outside the occupied antenna set, and determines an occupied time period of the at least one measured antenna.

S304. The second antenna selection module uses a set of the at least one measured antenna and the to-be-occupied antenna as a second measurement antenna.

In this embodiment, the occupied antenna set includes the occupied time period of each occupied antenna in the measured antennas of the terminal. Because the set includes the occupied time period of the occupied antenna, when the second antenna selection module also wants to measure a particular occupied antenna in the set, the second antenna selection module may select another non-conflicting time period for measurement. This does not affect measurement performed by the another module on the antenna, and can meet a measurement requirement of the second antenna selection module.

Certainly, in this embodiment, the occupied antenna set may further include an identifier of the occupied antenna in the measured antennas of the terminal.

Figure 7:
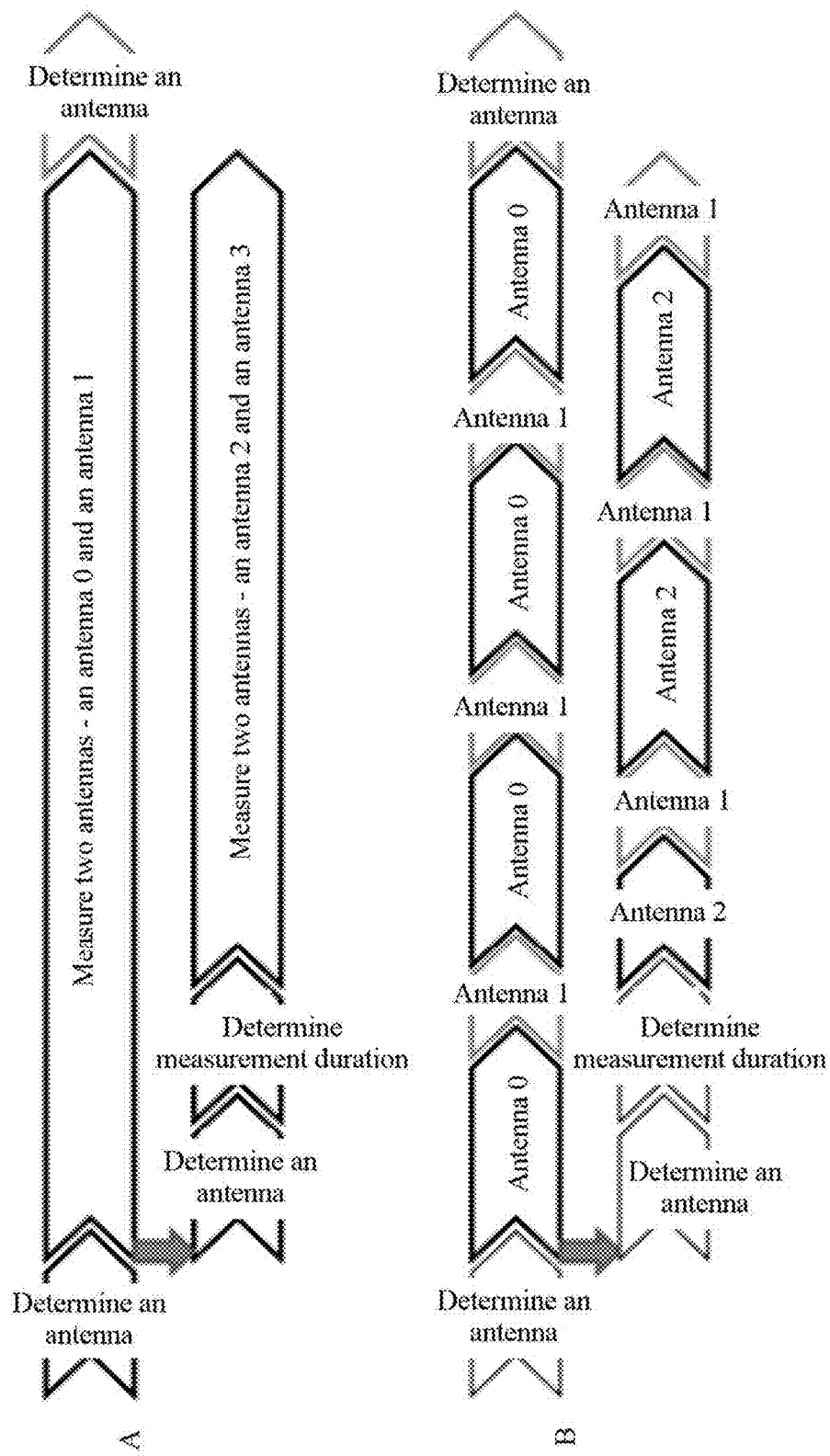
FIG. 7 is a schematic diagram of comparing two manners of determining a second measurement antenna based on an occupied antenna set.

FIG. 7 is a schematic diagram of comparing two manners of determining a second measurement antenna based on an occupied antenna set. As shown in FIG. 7, A indicates a manner in which the occupied antenna set includes only an antenna identifier, and B indicates a manner in which the occupied antenna set includes an antenna identifier and an occupied time period of an antenna. After antennas 0 and 1 in A are occupied by a module with a high priority, a module with a low priority cannot select the antennas 0 and 1 for measurement. However, after antennas 0 and 1 in B are occupied by the module with the high priority, the module with the low priority may still use an unoccupied time period of the antenna 1 to measure the antenna 1.

Based on the foregoing embodiment, a first antenna selection module and a second antenna selection module may further obtain a measurement antenna and measurement duration by querying a configuration table.

Specifically, the first antenna selection module obtains a first measurement antenna and measurement duration of the first measurement antenna from a preset configuration table. The second antenna selection module obtains a second measurement antenna and measurement duration of the second measurement antenna from the preset configuration table.

The preset configuration table is used to indicate a correspondence among an antenna selection module, a measurement antenna, and measurement duration.

To be specific, an antenna that needs to be measured by each module and duration required for measurement may be pre-configured. When needing to measure the antenna, a particular module directly queries, based on a current time, an antenna meeting the current time in the preset configuration table, to perform the measurement.

Only pre-configuration is needed in this manner. In a measurement process, no additional operation is needed, and therefore no conflict occurs between modules and high execution efficiency can be implemented.

Figure 8:
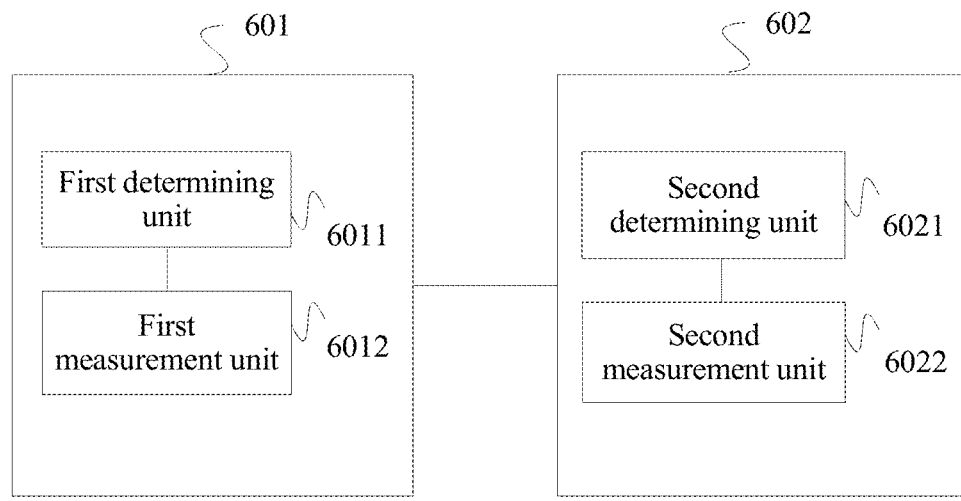
FIG. 8 is a structural module diagram of Embodiment 1 of a terminal according to an embodiment of the present invention.

FIG. 8 is a structural module diagram of Embodiment 1 of a terminal according to an embodiment of the present invention. The terminal includes at least two antenna selection modules. As shown in FIG. 8, the terminal includes a first antenna selection module 601 and a second antenna selection module 602.

The first antenna selection module 601 includes a first determining unit 6011 and a first measurement unit 6012.

The first determining unit 6011 is configured to: determine at least two measured antennas, use the determined at least two measured antennas as a first measurement antenna, and add the first measurement antenna to an occupied antenna set.

The first determining unit 6011 is further configured to determine measurement duration of the first measurement antenna.

The first measurement unit 6012 is configured to perform a measurement operation on the first measurement antenna.

The second antenna selection module 602 includes a second determining unit 6021 and a second measurement unit 6022.

The second determining unit 6021 is configured to: determine a second measurement antenna and measurement duration of the second measurement antenna based on the occupied antenna set and the measurement duration of the first measurement antenna, and add the second measurement antenna to the occupied antenna set.

The second measurement unit 6022 is configured to perform a measurement operation on the second measurement antenna.

The first measurement unit 6012 and the second measurement unit 6022 determine a measurement result of the first measurement antenna and a measurement result of the second measurement antenna when the measurement duration of the first measurement antenna ends.

The first antenna selection module 601 and the second antenna selection module 602 are modules capable of independently using an antenna in the terminal, and a priority of the second antenna selection module 602 for selecting the measured antenna is lower than a priority of the first antenna selection module 601 for selecting the measured antenna.

The terminal is configured to implement the foregoing method embodiment. Implementation principles and technical effects of the terminal are similar to those in the method embodiment. Details are not described herein again.

Figure 9:
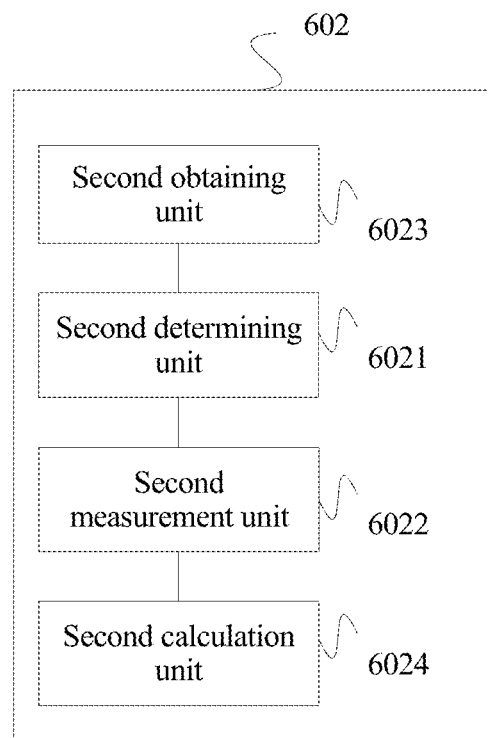
FIG. 9 is a structural module diagram of Embodiment 2 of a terminal according to an embodiment of the present invention.

FIG. 9 is a structural module diagram of Embodiment 2 of a terminal according to an embodiment of the present invention. As shown in FIG. 9, a second antenna selection module 602 further includes a second obtaining unit 6023 and a second calculation unit 6024.

The second obtaining unit 6023 is configured to obtain an occupied antenna set and measurement duration of a first measurement antenna.

A second determining unit 6021 is further configured to determine a second measurement antenna based on the occupied antenna set.

The second calculation unit 6024 is configured to: calculate a difference between the measurement duration of the first measurement antenna and duration that is of the second measurement antenna and that is determined by the second antenna selection module, and use the difference as measurement duration of the second measurement antenna.

In another embodiment, the second obtaining unit 6023 is specifically configured to:

receive a notification message sent by a first antenna module 601, where the notification message includes the occupied antenna set and the measurement duration of the first measurement antenna; and obtain the occupied antenna set and the measurement duration of the first measurement antenna from the notification message.

In another embodiment, the second obtaining unit 6023 is further specifically configured to:

obtain the occupied antenna set and the measurement duration of the first measurement antenna from a preset storage unit.

In another embodiment, the second determining unit 6021 is further specifically configured to:

select, from measured antennas outside the occupied antenna set, at least two measured antennas as the second measurement antenna.

In another embodiment, the occupied antenna set includes an occupied time period of each occupied antenna in measured antennas of the terminal, and correspondingly, the second determining unit 6021 is further specifically configured to:

select, from the occupied antenna set, at least one antenna as a to-be-occupied antenna; determine an occupied time period of the to-be-occupied antenna, so that the occupied time period of the to-be-occupied antenna does not overlap an occupied time period of an occupied antenna other than the to-be-occupied antenna in the occupied antenna set; select at least one measured antenna from measured antennas outside the occupied antenna set, and determine an occupied time period of the at least one measured antenna; and use a set of the at least one measured antenna and the to-be-occupied antenna as the second measurement antenna.

Figure 10:
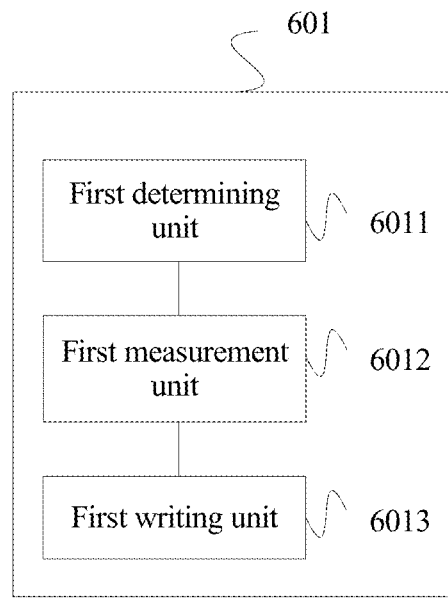
FIG. 10 is a structural module diagram of Embodiment 3 of a terminal according to an embodiment of the present invention.

FIG. 10 is a structural module diagram of Embodiment 3 of a terminal according to an embodiment of the present invention. As shown in FIG. 10, a first antenna selection module 601 further includes a first writing unit 6013.

The first writing unit 6013 is configured to write an occupied antenna set and measurement duration of a first measurement antenna into a preset storage unit.

Figure 11:
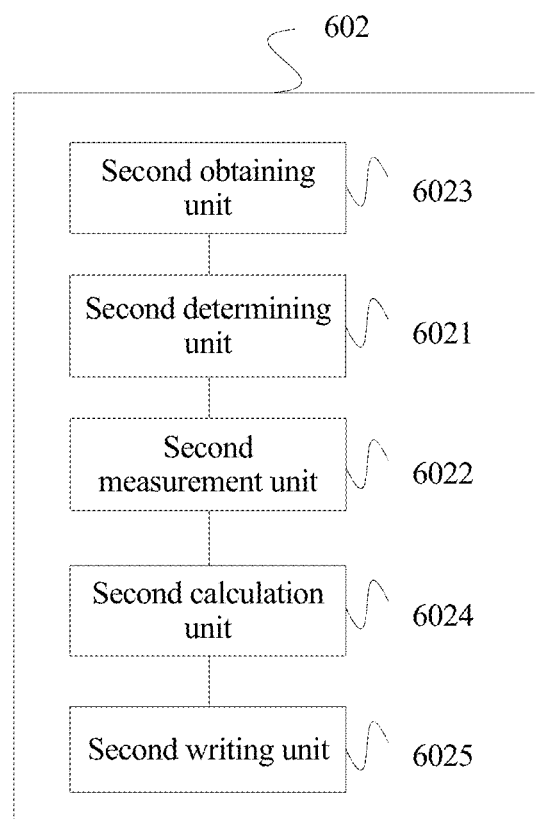
FIG. 11 is a structural module diagram of Embodiment 4 of a terminal according to an embodiment of the present invention.

FIG. 11 is a structural module diagram of Embodiment 4 of a terminal according to an embodiment of the present invention. As shown in FIG. 11, a second antenna selection module 602 further includes a second writing unit 6025.

The second writing unit 6025 is configured to write an occupied antenna set and measurement duration of a second measurement antenna into a preset storage unit.

In another embodiment, that the first measurement unit and the second measurement unit determine a measurement result of the first measurement antenna and a measurement result of the second measurement antenna when the measurement duration of the first measurement antenna ends is specifically:

if the measurement duration of the first measurement antenna ends, but the second measurement unit does not complete measurement of the second measurement antenna, stopping, by the second measurement unit, performing a measurement operation, and using, as the measurement result of the second measurement antenna, a measurement result of an antenna that has been measured in the second measurement antenna.

Figure 12:
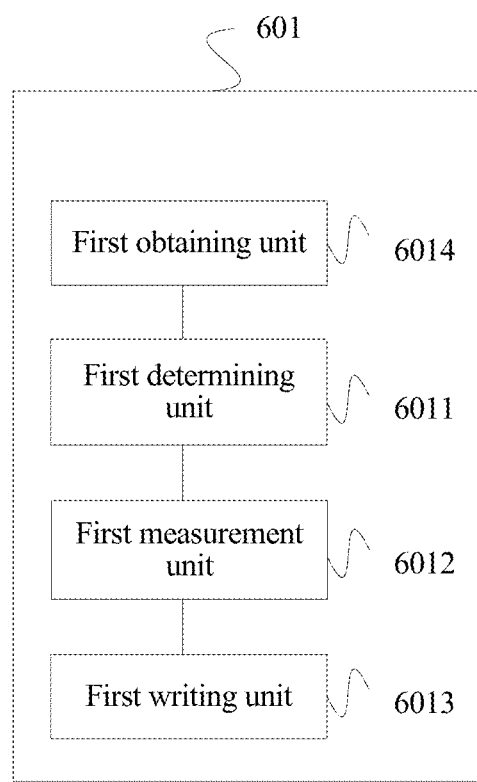
FIG. 12 is a structural module diagram of Embodiment 5 of a terminal according to an embodiment of the present invention.

FIG. 12 is a structural module diagram of Embodiment 5 of a terminal according to an embodiment of the present invention. As shown in FIG. 12, a first antenna selection module 601 further includes a first obtaining unit 6014.

The first obtaining unit 6014 is configured to obtain a first measurement antenna and measurement duration of the first measurement antenna from a preset configuration table.

In another embodiment, the second obtaining unit 6023 is further specifically configured to:

obtain a second measurement antenna and measurement duration of the second measurement antenna from the preset configuration table.

Preferably, the preset configuration table is used to indicate a correspondence among an antenna selection module, a measurement antenna, and measurement duration.

Optionally, the first antenna selection module 601 includes at least: a main of a primary mode, a diversity of the primary mode, a main of a secondary mode, and a diversity of the secondary mode.

This embodiment of the present invention further provides a terminal shown in FIG. 1, including a memory 1007 and a processor 1006.

The memory 1007 is configured to store a program instruction, and the processor 1006 is configured to invoke the program instruction in the memory 1007 to perform the following method.

The processor 1006 controls a first antenna selection module to:

determine at least two measured antennas, use the determined at least two measured antennas as a first measurement antenna, and add the first measurement antenna to an occupied antenna set;

determine measurement duration of the first measurement antenna; and perform a measurement operation on the first measurement antenna.

The processor 1006 controls a second antenna selection module to:

determine a second measurement antenna and measurement duration of the second measurement antenna based on the occupied antenna set and the measurement duration of the first measurement antenna, and add the second measurement antenna to the occupied antenna set; and perform a measurement operation on the second measurement antenna.

The processor 1006 controls the first antenna selection module and the second antenna selection module to: when the measurement duration of the first measurement antenna ends, determine a measurement result of the first measurement antenna and a measurement result of the second measurement antenna, where the first antenna selection module and the second antenna selection module are modules capable of independently using an antenna in the terminal, and a priority of the second antenna selection module for selecting the measured antenna is lower than a priority of the first antenna selection module for selecting the measured antenna.

Further, the processor 1006 is specifically configured to: control the second antenna selection module to:

obtain the occupied antenna set and the measurement duration of the first measurement antenna;

determine the second measurement antenna based on the occupied antenna set; and calculate a difference between the measurement duration of the first measurement antenna and duration that is of the second measurement antenna and that is determined by the second antenna selection module, and use the difference as the measurement duration of the second measurement antenna.

Further, the processor 1006 is further specifically configured to:

control the first antenna selection module to:

send a notification message to the second antenna module, where the notification message includes the occupied antenna set and the measurement duration of the first measurement antenna; and control the second antenna selection module to:

receive the notification message and obtain the occupied antenna set and the measurement duration of the first measurement antenna from the notification message.

Further, the processor 1006 is further specifically configured to:

control the second antenna selection module to:

obtain the occupied antenna set and the measurement duration of the first measurement antenna from a preset storage unit.

Further, the processor 1006 is further specifically configured to:

control the second antenna selection module to:

select, from measured antennas outside the occupied antenna set, at least two measured antennas as the second measurement antenna.

Further, the occupied antenna set includes an occupied time period of each occupied antenna in measured antennas of the terminal, and correspondingly, the processor 1006 is further specifically configured to:

control the second antenna selection module to:

select, from the occupied antenna set, at least one antenna as a to-be-occupied antenna;

determine an occupied time period of the to-be-occupied antenna, so that the occupied time period of the to-be-occupied antenna does not overlap an occupied time period of an occupied antenna other than the to-be-occupied antenna in the occupied antenna set;

select at least one measured antenna from measured antennas outside the occupied antenna set, and determine an occupied time period of the at least one measured antenna; and use a set of the at least one measured antenna and the to-be-occupied antenna as the second measurement antenna.

Further, the processor 1006 is further specifically configured to:

control the first antenna selection module to:

write the occupied antenna set and the measurement duration of the first measurement antenna into the preset storage unit.

Further, the processor 1006 is further specifically configured to:

control the second antenna selection module to:

write the occupied antenna set and the measurement duration of the second measurement antenna into the preset storage unit.

Further, the processor 1006 is further specifically configured to:

if the measurement duration of the first measurement antenna ends, but the second antenna selection module does not complete measurement of the second measurement antenna, control the second antenna selection module to:

stop performing the measurement operation, and use, as the measurement result of the second measurement antenna, a measurement result of an antenna that has been measured in the second measurement antenna.

Further, the processor 1006 is further specifically configured to:

control the first antenna selection module to:

obtain the first measurement antenna and the measurement duration of the first measurement antenna from a preset configuration table; and control the second antenna selection module to:

obtain the second measurement antenna and the measurement duration of the second measurement antenna from the preset configuration table.

Further, the preset configuration table is used to indicate a correspondence among an antenna selection module, a measurement antenna, and measurement duration.

Further, the first antenna selection module includes at least: a main of a primary mode, a diversity of the primary mode, a main of a secondary mode, and a diversity of the secondary mode.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An antenna measurement method, applied to a terminal comprising at least two antenna selection circuits, comprising:

determining, by a first antenna selection circuit in the terminal, at least two measured antennas;

setting, by the first antenna selection circuit, the at least two measured antennas as a first measurement antenna;

adding, by the first antenna selection circuit, the first measurement antenna to an occupied antenna set;

determining, by the first antenna selection circuit, measurement duration of the first measurement antenna;

performing, by the first antenna selection circuit, a measurement operation on the first measurement antenna;

determining, by a second antenna selection circuit, a second measurement antenna and measurement duration of the second measurement antenna based on the occupied antenna set and the measurement duration of the first measurement antenna;

adding, by the second antenna selection circuit, the second measurement antenna to the occupied antenna set;

performing, by the second antenna selection circuit, a measurement operation on the second measurement antenna; and determining, by the first antenna selection circuit and the second antenna selection circuit, a measurement result of the first measurement antenna and a measurement result of the second measurement antenna when the measurement duration of the first measurement antenna ends to select an optimal quality antenna of the terminal, the first antenna selection circuit and the second antenna selection circuit being capable of independently using an antenna in the terminal, and a priority of the second antenna selection circuit for selecting a measured antenna being lower than a priority of the first antenna selection circuit for selecting the measured antenna.

2. The method of claim 1, wherein determining the second measurement antenna and the measurement duration of the second measurement antenna comprises:

obtaining, by the second antenna selection circuit, the occupied antenna set and the measurement duration of the first measurement antenna;

determining, by the second antenna selection circuit the second measurement antenna based on the occupied antenna set;

calculating, by the second antenna selection circuit, a difference between the measurement duration of the first measurement antenna and duration of the second measurement antenna; and setting, by the second antenna selection circuit, the difference as the measurement duration of the second measurement antenna.

3. The method of claim 2, wherein obtaining the occupied antenna set and the measurement duration of the first measurement antenna comprises:

sending, by the first antenna selection circuit a notification message to the second antenna selection circuit, the notification message comprising the occupied antenna set and the measurement duration of the first measurement antenna;

receiving, by the second antenna selection circuit, the notification message; and obtaining, by the second antenna selection circuit, the occupied antenna set and the measurement duration of the first measurement antenna from the notification message.

4. The method of claim 2, wherein obtaining the occupied antenna set and the measurement duration of the first measurement antenna comprises obtaining, by the second antenna selection circuit, the occupied antenna set and the measurement duration of the first measurement antenna from a preset storage.

5. The method of claim 4, wherein determining the second measurement antenna based on the occupied antenna set comprises selecting, by the second antenna selection circuit from measured antennas outside the occupied antenna set, at least two measured antennas as the second measurement antenna.

6. The method of claim 4, wherein the occupied antenna set comprises an occupied time period of each occupied antenna in measured antennas of the terminal, and determining the second measurement antenna based on the occupied antenna set comprising:

selecting, by the second antenna selection circuit from the occupied antenna set, at least one antenna as a to-be-occupied antenna;

determining, by the second antenna selection circuit an occupied time period of the to-be-occupied antenna avoiding overlap of an occupied time period of an occupied antenna other than the to-be-occupied antenna in the occupied antenna set;

selecting, by the second antenna selection circuit at least one measured antenna from measured antennas outside the occupied antenna set;

determining, by the second antenna selection circuit, an occupied time period of the at least one measured antenna; and setting, by the second antenna selection circuit, a set of the at least one measured antenna and the to-be-occupied antenna as the second measurement antenna.

7. The method of claim 4, wherein after performing the measurement operation on the first measurement antenna, the method further comprises: writing, by the first antenna selection circuit the occupied antenna set and the measurement duration of the first measurement antenna into the preset storage.

8. The method of claim 7, wherein after performing the measurement operation on the second measurement antenna, the method further comprises writing, by the second antenna selection circuit, the occupied antenna set and the measurement duration of the second measurement antenna into the preset storage.

9. The method of claim 8, wherein determining the measurement result of the first measurement antenna and the measurement result of the second measurement antenna comprises:

stop performing, by the second antenna selection circuit, the measurement operation on the second measurement antenna when the measurement duration of the first measurement antenna ends, but the second antenna selection circuit does not complete measurement of the second measurement antenna; and setting, by the second antenna selection circuit, as the measurement result of the second measurement antenna, a measurement result of an antenna that has been measured in the second measurement antenna.

10. The method of claim 1, further comprising:

obtaining, by the first antenna selection circuit, the first measurement antenna and the measurement duration of the first measurement antenna from a preset configuration table; and obtaining, by the second antenna selection circuit the second measurement antenna and the measurement duration of the second measurement antenna from the preset configuration table.

11. The method of claim 10, wherein the preset configuration table indicating a correspondence among an antenna selection circuit a measurement antenna, and measurement duration.

12. The method of claim 1, wherein the first antenna selection circuit comprises at least one of:

a main of a primary mode;

a diversity of the primary mode;

a main of a secondary mode; or a diversity of the secondary mode.

13. A terminal, comprising a first antenna selection circuit is configured to:
determine at least two measured antennas;
set the at least two measured antennas as a first measurement antenna;
add the first measurement antenna to an occupied antenna set;
determine measurement duration of the first measurement antenna; and
perform a measurement operation on the first measurement antenna; and a second antenna selection circuit coupled to the first antenna selection circuit and configured to:
determine a second measurement antenna and measurement duration of the second measurement antenna based on the occupied antenna set and the measurement duration of the first measurement antenna;
add the second measurement antenna to the occupied antenna set; and
perform a measurement operation on the second measurement antenna, the first antenna selection circuit and the second antenna selection circuit being further configured to determine a measurement result of the first measurement antenna and a measurement result of the second measurement antenna when the measurement duration of the first measurement antenna ends t select an optimal quality antenna of the terminal, the first antenna selection circuit and the second antenna selection circuit being capable of independently using an antenna in the terminal, and a priority of the second antenna selection circuit for selecting a measured antenna being lower than a priority of the first antenna selection circuit for selecting the measured antenna.

14. The terminal of claim 13, wherein the second antenna selection circuit is further configured to:
- obtain the occupied antenna set and the measurement duration of the first measurement antenna;
- determine the second measurement antenna based on the occupied antenna set;
- calculate a difference between the measurement duration of the first measurement antenna and duration of the second measurement antenna; and
- set the difference as the measurement duration of the second measurement antenna.

15. The terminal of claim 14, wherein the second antenna selection circuit is further configured to:
- receive a notification message from the first antenna selection circuit comprising the occupied antenna set and the measurement duration of the first measurement antenna; and
- obtain the occupied antenna set and the measurement duration of the first measurement antenna from the notification message.

16. The terminal of claim 14, wherein the second antenna selection circuit is further configured to obtain the occupied antenna set and the measurement duration of the first measurement antenna from a preset storage.

17. The terminal of claim 16, wherein the second antenna selection circuit is further configured to select, from measured antennas outside the occupied antenna set, at least two measured antennas as the second measurement antenna.

18. The terminal of claim 16, wherein the occupied antenna set comprises an occupied time period of each occupied antenna in measured antennas of the terminal, and the second antenna selection circuit being further configured to:
- select, from the occupied antenna set, at least one antenna as a to-be-occupied antenna;
- determine an occupied time period of the to-be-occupied antenna avoiding overlap of an occupied time period of an occupied antenna other than the to-be-occupied antenna in the occupied antenna set;
- select at least one measured antenna from measured antennas outside the occupied antenna set;
- determine an occupied time period of the at least one measured antenna; and
- set a set of the at least one measured antenna and the to-be-occupied antenna as the second measurement antenna.

19. The terminal of claim 16, wherein the first antenna selection circuit further configured to write the occupied antenna set and the measurement duration of the first measurement antenna into the preset storage-unit.

20. The terminal of claim 19, wherein the second antenna selection circuit further configured to write the occupied antenna set and the measurement duration of the second measurement antenna into the preset storage.

* * * * *